Patented Aug. 6, 1940

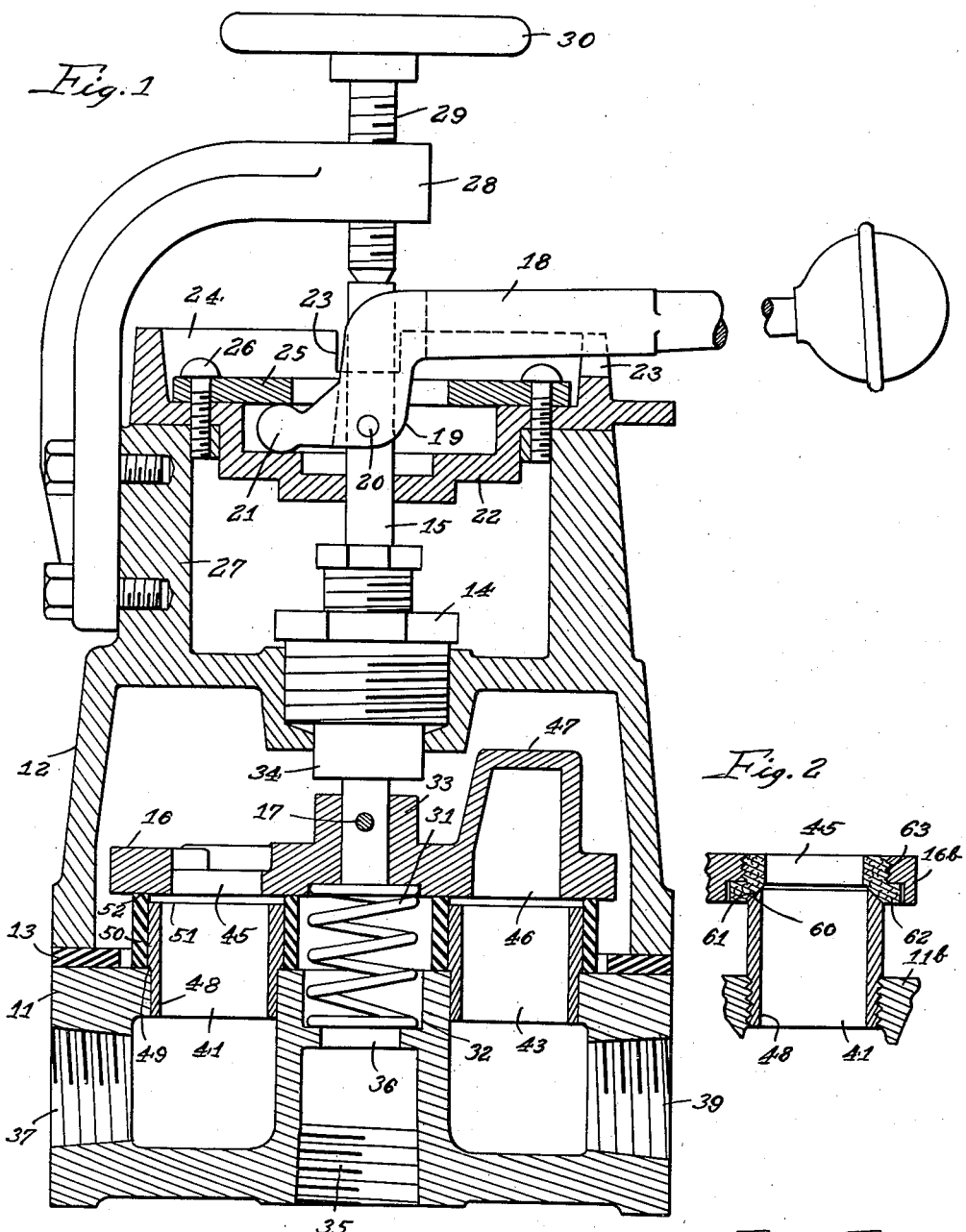

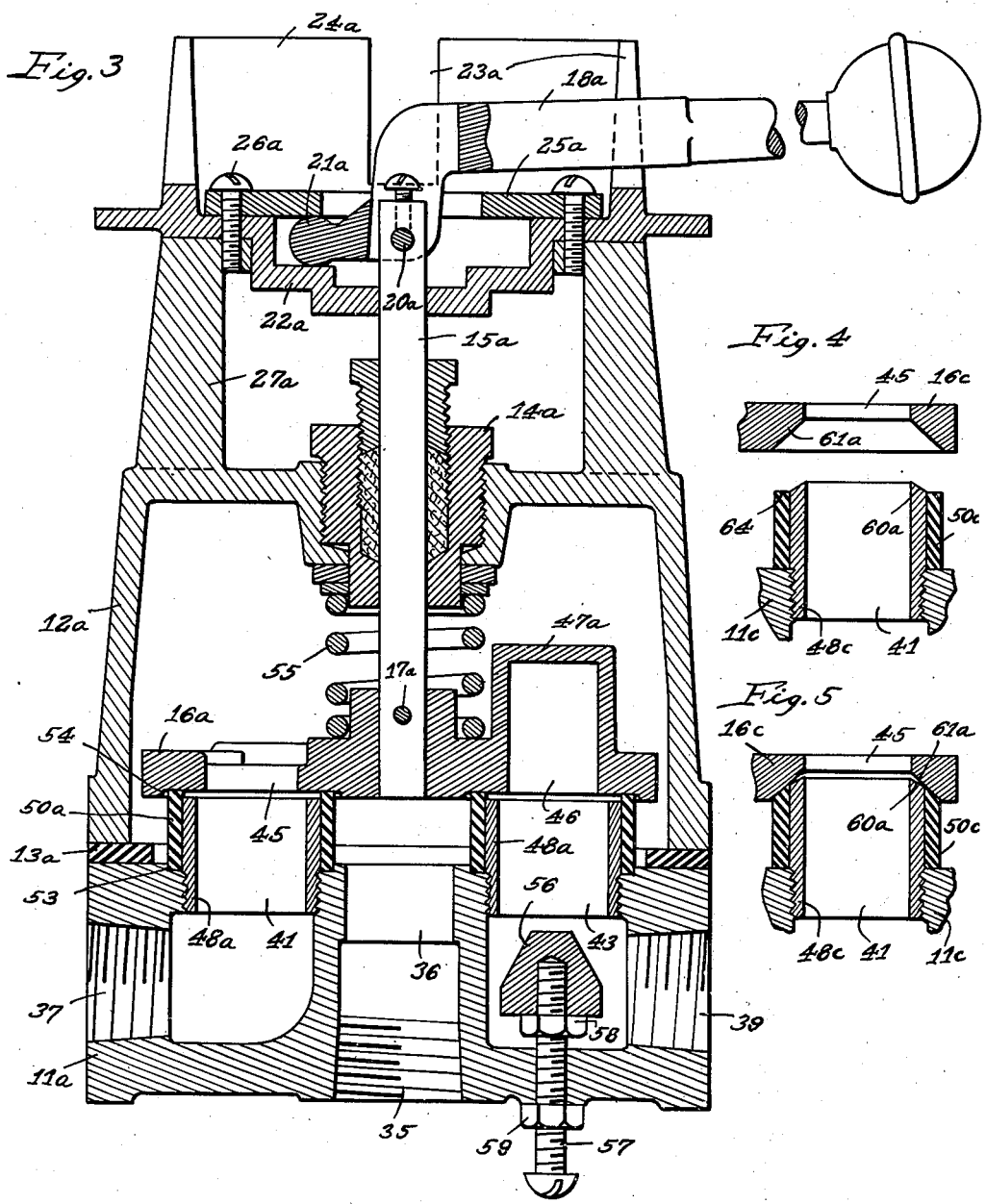

2,209,992

UNITED STATES PATENT OFFICE 2,209,992

MULTIPORT LIFT-TURN VALVE

Chester T. McGill, Elgin, Ill.

Application March 19, 1938, Serial No. 196,807

17 Claims. (Cl. 251—84)

This invention relates to a new and improved multiport lift-turn valve.

I am aware that rotary plate type valves have been constructed having the plate liftable so as to avoid scoring of its face and the companion face on the stator in turning the same from one position to another, and I am also aware that various provisions have been made in these lift-turn valves to effect a seal in the seating of the plate in its different positions. However, there has invariably been certain objections to these designs which it is the principal aim of my present invention to avoid.

The valve of my invention is designed with the following objectives in mind:

1. To provide for easy lifting and turning by having the rotary plate in spaced relation to the stator when seated, thus obtaining a partly balanced pressure condition.

1a. To provide a valve of the lift-turn type in which the water pressure is utilized largely, and in some cases solely, as the means to keep the plate tightly seated.

2. To provide rigid upwardly projecting tubular seat supporting elements on the stator with tubular rubber seals or seats surrounding the same, whereby to combine solid seating of the rotor with good sealing, while incorporating the rubber seals in a way where the water pressure active on the seals tends to increase the tightness of their fit on the supporting elements.

3. To provide the rubber seals in such relation to the tubular supports that the sealing action is more positive, because the yield of the rubber makes up for any slight irregularity in the construction of the valve and possible lack of true parallelism between the stator and rotor, the rubber seals being certain of sufficient yield in the present structure because they are subjected to endwise or longitudinal compression which is moreover beneficial from the standpoint of increased durability.

4. To provide a valve of the type just mentioned wherein the tubular rubber seals fit at their ends in grooves either in the rotor or stator, or in both of these members, whereby to better insure water-tight sealing action.

5. To provide a valve of the kind mentioned of economical construction and one which permits easy and economical replacement of the sealing means.

6. To provide a lift-turn valve so designed that metal-to-metal seating is rendered practical, and danger of scoring and consequent leakage is reduced to a minimum.

7. To provide a valve in which there is metal-to-metal seating, and the sealing action is obtained by wedging engagement of tapered seating surfaces, with a tubular rubber seal surrounding the flat ended tubular seat aiding in obtaining the desired sealing action.

8. To provide lift-turn valves of either of the two general types mentioned, having screw-down means in conjunction with the stem of the rotor, or in conjunction with the lever for lifting and turning the rotor, to clamp the rotor down tightly on the seats and seals to prevent leakage.

9. To provide lift-turn valves of either of the two general types mentioned, having spring means tending normally to lift the rotor, whereby to offset some of the water pressure active on the rotor which otherwise tends to seat the same too quickly, whereby to avoid water-hammer action by insuring gradual seating.

These and other objects of my invention will appear in the following description in which reference is made to the accompanying drawings, wherein—

Figure 1 is a central vertical section through a multiport valve embodying my invention;

Fig. 2 is a fragmentary sectional detail of a modified valve seat construction;

Fig. 3 is a view similar to Fig. 1, but showing still another valve seat construction provided in accordance with my invention, and Figs. 4 and 5 are fragmentary sectional details showing another valve seat construction, the plate being shown unseated in Fig. 4 and seated in Fig. 5.

Similar reference numerals are applied to corresponding parts throughout the views.

Referring first to Fig. 1, 11 designates the stator or body member of the valve on which a cap or cover 12 is suitably secured, compressing a gasket 13 therebetween to prevent leakage. A packing gland 14 in the center of the top wall of the cover 12 prevents leakage around the valve stem 15 which is reciprocable and rotatable to lift and turn the rotor or stem plate 16, suitably secured to the stem, as indicated at 17. A hand lever 18 has a bifurcated portion 19 through which the upper end of the stem 15 extends and in which the stem is pivotally connected to the handle by a cross-pin 20. The rounded end 21 of the lever 18 is slidably fulcrumed on the index plate 22 which has notches 23 in an upstanding annular flange 24 for releasably locking the lever 18 in certain positions and accordingly hold the rotor in adjusted position. A ring 25 of the index plate 22 prevents upward displacement of the rounded end 21 of the lever 18, and is held in place by screws 26 which serve also to fasten the index plate 22 to the arms 27 extending upwardly from the cover 12. Now, while I have shown a hold-down screw it should be understood this may be dispensed with, as I have found by trial that the hydraulic pressure is sufficient to keep the rotor plate tightly seated. In the case of Fig. 3, while a hold-down spring is shown, I realize it may be omitted, if desired. A yoke 28 suitably fastened to or formed integral with one of the arms 27 extends over the upper end of the stem 15 and carries a screw 29 rotatable by means of a hand wheel 30. When the screw 29 is backed away from the stem, one may lift the rotor 16 by means of the handle 18 and then turn the rotor and reseat it, with the lever 18 engaged in another notch 23, after which the screw 29 can be threaded back again against the upper end of the stem to clamp the rotor 16 in adjusted position. A coiled compression spring 31 is shown in a seat 32 in the center of the stator 11 tending normally to urge the rotor 16 upwardly. This spring pressure nearly counterbalances the hydraulic pressure on the rotor 16 tending to seat it, and hence it requires very little force applied to the outer end of the lever 18 to lift the rotor. Furthermore, this spring will serve to prevent the rotor from being seated too quickly, and water-hammer action is thereby eliminated as the rotor is seated gradually. The extent to which the rotor is lifted when unseated and turned from one position to another is limited by engagement of the central boss 33 on the rotor with the lower end 34 of the gland structure 14. The spring 31 is therefore kept caged between the rotor 16 and seat 32 and no additional retaining means is necessary. The central location of the spring 31 with respect to the plate 16 and stem 15 is advantageous in unseating the plate evenly and without a tendency for the stem to bind.

While the present invention is applicable to valves generally, the one disclosed is designed for use in controlling the flow of fluids to and from a zeolite water softener, and the stator 11 has a central axial threaded opening 35 for connection with the raw water supply pipe. Hence, the port 36 communicating with this opening may properly be called a pressure port. A plurality of radial threaded openings like those shown at 37 and 39 in Fig. 1 are provided in the stator in circumferentially spaced relation for connection to pipes that conduct fluid into and out of the valve, through the central pressure port 36 and circumferentially spaced ports in the top of the stator, like those shown at 41 and 43 in Fig. 1. Now, the rotor 16 has circumferentially spaced ports like those shown at 45 and 46 which come into register with the circumferentially spaced ports in the stator in different operative positions of rotary adjustment in the rotor. In addition, there is a hollow boss 47 on the rotor which serves to provide a connecting passage between the port 46 and another port in the rotor which does not appear in Fig. 1. This boss therefore provides communication between whatever stator ports are placed in communication with the rotor ports interconnected by said boss. It is clear that the rotor 16 will be turned to positions predetermined by the location of the notches 23, so as to bring rotor ports selectively into registration with stator ports, whereby to control the flow of fluid through the valve in a predetermined manner.

Rigid metallic tubular seat supporting elements 48 are entered with a press fit in the stator ports and project upwardly from the stator a uniform height determined by annular shoulders 49 on the outside thereof engaging the face of the stator. These supports carry tubular rubber seals or seats 50 and cooperate therewith to provide sealed engagement between the stator and rotor. The supports 48 and seals together also provide solid seating for the rotor, besides spacing the rotor relative to the stator to obtain a partly balanced hydraulic pressure condition. The tubular rubber seals 50 fit snugly around the supports 48 and project upwardly slightly beyond the upper ends 51 to provide yieldable seating and sealing surfaces 52 annularly with respect to the upper ends 51 of the supports 48. It is obvious that the water pressure active on the tubular rubber seals 50 will tend to increase the tightness of their fit on the supports 48. There is, therefore, no danger of water leakage between the tubular rubber seals and the supports. I show the rotor 16 spaced appreciably from the flat upper ends 51 of the supports 48, but in actual practice when the screw 29 is tightened to the usual extent, the tubular rubber seals 50 will be compressed enough to bring the rotor 16 almost into contact, if not actually into contact, with the flat upper ends 51 of the supports 48. The rubber seals, therefore, give a very positive sealing action, because the yield of the rubber makes up for whatever slight irregularities there may be in the construction of the valve, or lack of true parallelism between the stator and rotor. The fact that the rubber seals are compressed endwise, assures a sufficient column of rubber to provide the required amount of yield. This design furthermore makes for durability, because the compression is not sufficient to impose much of a strain upon the rubber. The supports also serve positively to limit compression of the seals, thus preventing damage by overtightening of the clamping screw.

The valve of Fig. 3 is generally similar, but in this case the tubular supports 48a are shown threaded in place and cooperating with tubular rubber seals 50a which at their lower ends fit down into a counterbored groove 53 in the stator 11a to better insure water-tight sealing action, it being obvious that such construction minimizes any likelihood of water finding its way between the rubber seal and the outside of the tubular support. The rotor 16a, in this case, is also recessed, as at 54, to accommodate the upper ends of the seals and supports. These recessed seating surfaces will, of course, be accurately machined in the bottom face of the rotor to smooth form and in exact parallelism with the upper ends of the tubular seats, so that good sealing action is insured. If desired, the circular recesses 54 may be of the same diameter as the outside diameter of the seals 50a, so that when the rotor is brought down against the seals 50a and compresses the same, the upper ends of the seals will fit tightly into grooves similarly as the lower ends, to insure water-tight sealing action. The valve shown in Fig. 3 has a hand lever 18a for lifting and turning the rotor by means of the stem 15a. A coiled compression spring 55 holds the rotor 16a seated under spring pressure, and the lever 18a is operated against this spring pressure as well as the hydraulic pressure effective on the rotor when unseating is commenced. The ports in this valve are numbered the same as the ports in the valve of Fig. 1, but the cover is numbered 12a, and other parts similarly corresponding to parts in the valve of Fig. 1 are similarly numbered. The tapered variable restriction valve shown at 56 mounted on a screw 57 for adjustment relative to the lower end of the tubular support 48a in the port 43 is adjustable on the screw 57 and adapted to be locked with a nut 58. The lock nut 59 outside the stator 11a serves to lock the screw 57 in adjusted position.

Fig. 2 illustrates a tubular valve seat 48b threaded in the stator 11b and having a tapered upper end 60 adapted to engage wedgingly in a tapered counterbore 61 in a seat ring 62 threaded, as at 63, in the rotor 16b. All of the tubular seats 48b on the stator, it should be understood, will be metallic, but the seat rings 62 in the rotor ports will preferably be of composition material, so as to avoid metal-to-metal engagement and provide good water-tight sealing action when the tapers of the tubular seats wedge in the tapers of the seat rings. The seat rings 62, it should be understood, will be easily replaceable at low cost when they become worn.

The construction shown in Figs. 4 and 5 is somewhat similar to that of Fig. 2, but here the tubular metallic valve seats 48c threaded in the stator 11c have the upper ends thereof tapered, as at 60a, at a greater angle with respect to the axis than the tapered seating surface 61a provided in the rotor 16c, and a tubular rubber seal 50c fits snugly around the tubular seat and terminates in a flat upper end 64 substantially in the same plane with the end of the bevel surface 60a, so that there is an annular projecting shoulder of rubber which will be compressed within the taper 61a when the rotor is seated, substantially as illustrated in Fig. 5 to insure a good water-tight seal. It will of course be understood that all of the ports in the stator and rotor will be similarly constructed.

I claim:

1. In a plate type valve, comprising a ported body member, and a ported plate member, separate and independent compressible resilient tubular seats communicating with and projecting from the ports of one of said members so as to present longitudinally compressible end portions for engagement with and compression against flat seating surfaces provided on the other member to space said members relative to one another and establish sealed communication with the ports of the other member in different positions of the plate member in operative relation to the body member, and means for turning the plate member.

2. In a plate type valve, comprising a ported body member, and a ported plate member, rigid tubular seat supporting elements defining the ports of one of said members and projecting therefrom, separate and independent compressible resilient tubular seats in telescoping relation therewith and projecting normally from the outer ends thereof, the telescoped parts cooperating to space said members relative to one another and establish sealed communication between their ports in different positions of the plate member in operative relation to the body member said tubular seats being small in wall thickness relative to their diameters and length, and means for relieving seating pressure on the plate member and turning the plate member.

3. In a plate type valve, comprising a ported body member, and a ported plate member, separate and independent compressible resilient tubular seats communicating with and projecting from the ports of one of said members so as to present longitudinally compressible end portions for engagement with and compression against flat seating surfaces provided on the other member to space said members relative to one another and establish sealed communication with the ports of the other member in different positions of the plate member in operative relation to the body member, and means for unseating, turning, and reseating the plate member.

4. A valve as set forth in claim 2, wherein the member engaged by the ends of the tubular seats in the seating of the plate member has recesses provided in the cooperating face thereof adapted to receive the ends of said seats.

5. A valve as set forth in claim 2, wherein the member carrying said tubular seat supporting elements has annular grooves provided therein around the bases of the elements, in which the ends of said tubular seats are received with a close fit, for the purpose described.

6. A valve as set forth in claim 2, wherein the member carrying said tubular seat supporting elements has annular grooves provided therein around the bases of the elements, in which the ends of said tubular seats are received with a close fit, for the purpose described, and wherein the face of the other member adapted to be engaged by the other ends of said tubular seats has recesses provided therein to receive the cooperating ends of said seats.

7. In a plate type valve, comprising a ported body member, and a ported plate member, rigid tubular seat supporting elements defining the ports of one of said members and projecting therefrom, separate and independent compressible resilient tubular seats in telescoping relation therewith and projecting normally from the outer ends thereof, the telescoped parts cooperating to space said members relative to one another and establish sealed communication between their ports in different positions of the plate member in operative relation to the body member, said tubular seats being small in wall thickness relative to their diameters and length, said seat supporting elements being adapted to limit the compression of said seats by positive engagement with the face of the other member, and means for relieving seating pressure on the plate member and turning the plate member, said means including a threaded member for adjustably forcibly seating the plate member.

8. In a plate type valve, comprising a ported body member, and a ported plate member, separate and independent tubular members of compressible resilient material carried on one of said members surrounding the ports therein and adapted to be compressed endwise between the members in communication with the ports of the other member when the plate member is seated, whereby to provide sealed communication between the plate and body members, said tubular members being small in wall thickness relative to their diameters and length, means positively limiting the longitudinal compression of said members incident to seating movement of the plate member, and means for relieving seating pressure on the plate member and turning the plate member.

9. In a plate type valve, comprising a ported body member, and a ported plate member, rigid tubular seat supporting elements inserted in and projecting from the ports in a flat face provided on one of said members, separate and independent compressible resilient tubular seats in fluid tight telescoping relation with and supported on the outside of said seat supporting elements and projecting alike from the outer ends thereof to space said members relative to one another and establish sealed communication between their ports in different positions of the plate member in operative relation to the body member, said tubular seats being small in wall thickness in relation to their diameters and length, the outer ends of said seat supporting elements being flat and all in a common plane, each of said seat supporting elements having an annular external shoulder provided thereon in a predetermined spaced relation to the flat outer end whereby the location of the flat outer end of each seat supporting element relative to the plane of the flat face of the member carrying the same being determined by engagement of said annular external shoulder with said face, the other member having a coacting flat face in a plane parallel with the plane of the ends of said seats, and means for turning the plate member.

10. In a plate type valve, comprising a ported body member, and a ported plate member, rigid tubular seat supporting elements defining the ports of one of said members and projecting therefrom, separate and independent compressible resilient tubular seats in fluid tight telescoping relation with and supported on the outside of said seat supporting elements and cooperating with the latter to space said members relative to one another and establish sealed communication between their ports in different positions of the plate member in operative relation to the body member, said tubular seats being of small wall thickness in relation to their diameters and length and projecting normally from the outer ends of said seat supporting elements for compression in the seating of the plate member, the outer ends of said seats being substantially flat and all in one common plane spaced from the plane including the outer ends of all of said seat supporting elements, the latter being likewise substantially flat, and means for turning the plate member.

11. In a plate type valve, comprising a ported body member, and a ported plate member, rigid tubular seats inserted in and projecting from the ports of one of said members to space said members relative to one another and establish communication with the ports of the other member in different positions of the plate member in sealed operative relation to the body member, the outer ends of said tubular seats being adapted to engage in the ports in the other member, the coacting ports in the other member having tapered surfaces surrounding the same, for wedging engagement of the outer ends of said tubular seats therein, tubular seals of resilient compressible material surrounding said tubular seats and having the outer ends thereof arranged to be compressed by engagement with the tapered surfaces around the coacting ports last-named, and means for unseating, turning, and reseating the plate member.

12. In a plate type valve, comprising a ported body member, and a ported plate member, rigid tubular seats defining the ports of one of said members and projecting therefrom to space said members relative to one, aonther and establish communication with the ports of the other member in different positions of the plate member in sealed operative relation to the body member, the outer ends of said tubular seats being externally tapered for wedging engagement in the ports of the other member, separate and independent tubular seals of resilient compressible material surrounding said tubular seats and arranged so as to be compressed endwise in the wedging of the tubular seats in the ports, and means for unseating, turning, and reseating the plate member.

13. In a plate type valve, comprising a ported body member, and a ported plate member, rigid tubular seats defining the ports of one of said members and projecting therefrom to space said members relative to one another and establish communication with the ports of the other member in different positions of the plate member in sealed operative relation to the body member, the outer ends of said tubular seats being externally tapered for wedging engagement in the ports of the other member, the latter member having tapered surfaces surrounding the ports therein, separate and independent tubular seals of resilient compressible material surrounding said tubular seats having their outer ends arranged to be compressed by engagement with the aforesaid tapered surfaces, and means for unseating, turning, and reseating the plate member.

14. In a plate type valve comprising a ported body member and a ported plate member, separate and independent compressible resilient tubular sheets communicating with and projecting from the ports of one of said members to space said members relative to one another and establish sealed communication between their ports in different positions of the plate member in operative relation to the body member, the tubular seats being small in wall thickness in relation to their diameters and length so as to be relatively easily compressible longitudinally, substantially rigid tubular supports for said seats extending the major portion of their length in their uncompressed condition, and means for turning the plate member.

15. In a plate type valve comprising a ported body member and a ported plate member, separate and independent compressible resilient tubular seats communicating with and projecting from the ports of one of said members to space said members relative to one another and establish sealed communication between their ports in different positions of the plate member in operative relation to the body member, the tubular seats being small in wall thickness in relation to their diameters and length so as to be relatively easily compressible longitudinally, substantially rigid tubular supports for laterally supporting said seats, said supports being shorter than said seats but of sufficient length to serve as a means for positively limiting longitudinal compression thereof, and means for relieving seating pressure on the plate member and turning the plate member.

16. In a plate type valve comprising a ported body member and a ported plate member, separate and independent compressible resilient tubular seats communicating with and projecting from the ports of one of said members to space said members relative to one another and establish sealed communication between their ports in different positions of the plate member in operative relation to the body member, the tubular seats being small in wall thickness in relation to their diameters and length so as to be relatively easily compressible longitudinally, substantially rigid tubular supports for laterally supporting said seats, said supports being shorter than said seats but of sufficient length to serve as a means for positively limiting longitudinal compression thereof, and means for unseating, turning, and reseating the plate member, the last-mentioned means including threaded means for adjustably forcibly seating the plate member.

17. In a plate type valve, comprising a ported body member, and a ported plate member, separate and independent compressible resilient tubular seats communicating with and projecting from the ports of one of said members so as to present longitudinally compressible end portions for engagement with and compression against flat seating surfaces provided on the other member to space said members relative to one another and establish sealed communication with the ports of the other member in different positions of the plate member in operative relation to the body member, and means for relieving seating pressure of the plate member on said seats and turning the plate member.

CHESTER T. McGILL.